US012719207B1

(12) United States Patent
Strider et al.

(10) Patent No.: US 12,719,207 B1
(45) Date of Patent: Aug. 25, 2026

(54) CARTRIDGE STYLE MATING AND MOUNTING HARDWARE

(71) Applicant: AIRBORN, LLC, Georgetown, TX (US)

(72) Inventors: Ryan Strider, Georgetown, TX (US); Kevin Traugott, Georgetown, TX (US); Matt Gold, Little Falls, MN (US); William Rhea, Georgetown, TX (US)

(73) Assignee: AIRBORN, LLC

( * ) Notice: Subject to any disclaimer, the term of this patent is extended or adjusted under 35 U.S.C. 154(b) by 501 days.

(21) Appl. No.: 18/137,154

(22) Filed: Apr. 20, 2023

Related U.S. Application Data

(60) Provisional application No. 63/333,062, filed on Apr. 20, 2022.

(51) Int. Cl.
*H01R 13/621* (2006.01)
*H01R 13/512* (2006.01)

(52) U.S. Cl.
CPC ......... *H01R 13/621* (2013.01); *H01R 13/512* (2013.01)

(58) Field of Classification Search
CPC ............................ H01R 13/621; H01R 13/512
See application file for complete search history.

(56) References Cited

U.S. PATENT DOCUMENTS 2,022,669 A 12/1935 Keefe
3,167,373 A 1/1965 Kostich
3,924,922 A 12/1975 DeCenzo
4,090,772 A 5/1978 Goodman
4,461,531 A 7/1984 Davis
4,934,967 A 6/1990 Marks et al.
4,986,769 A 1/1991 Adams, III
4,993,975 A 2/1991 Asick
5,051,100 A 9/1991 Kato et al.
5,056,829 A 10/1991 Kramer
(Continued)

FOREIGN PATENT DOCUMENTS

CN 104882691 B 10/2017
CN 110492304 A1 8/2019
(Continued)

*Primary Examiner* — Travis S Chambers
(74) *Attorney, Agent, or Firm* — Perilla Knox & Hildebrandt LLP; Usha Munukutla-Parker

(57) ABSTRACT

An improved connector for an electrical cable and method therefor uses cartridge style mating and mounting hardware for mating connectors to one another and for mounting the connectors to a printed circuit board (PCB). In some embodiments, the mating and mounting hardware includes connector shells and mating and mounting assemblies that are fully interchangeable and replaceable. In some embodiments, the mating and mounting assemblies have tapered seating faces that facilitate positioning and aligning the assemblies to their respective shells. The availability of interchangeable mating and mounting hardware means fewer types of components are required to be stocked and tracked in inventory, thereby reducing inventory maintenance costs. In addition, the use of interchangeable mating and mounting hardware greatly simplifies manufacturing and assembly, thereby further reducing costs.

20 Claims, 6 Drawing Sheets

(56) References Cited

U.S. PATENT DOCUMENTS

| | | | |
|---|---|---|---|
| 5,071,375 A | 12/1991 | Savage, Jr. | |
| 5,176,536 A | 1/1993 | Ganger et al. | |
| 5,295,844 A | 3/1994 | Koshikawa et al. | |
| 5,509,814 A | 4/1996 | Mosquera | |
| 5,599,212 A | 2/1997 | Sawada | |
| 5,620,347 A | 4/1997 | Sawada | |
| 5,897,404 A | 4/1999 | Goodman | |
| 5,924,879 A | 7/1999 | Kameyama | |
| 5,938,487 A | 8/1999 | Henry | |
| 6,188,583 B1 | 2/2001 | Fendt et al. | |
| 6,217,368 B1 * | 4/2001 | Baron | H01R 13/629 439/378 |
| 6,250,974 B1 | 6/2001 | Kerek | |
| 6,299,482 B1 * | 10/2001 | Huang | H01R 12/7029 439/607.32 |
| 6,394,858 B1 | 5/2002 | Geltsch et al. | |
| 6,520,803 B1 | 2/2003 | Dunn | |
| 7,048,597 B2 | 5/2006 | Chen | |
| 7,140,891 B1 | 11/2006 | Huang et al. | |
| 7,223,108 B2 | 5/2007 | Chiang et al. | |
| 7,234,966 B2 | 6/2007 | Choy | |
| 7,347,741 B1 | 3/2008 | Yeomans | |
| 7,789,721 B1 | 9/2010 | Burdenko | |
| 8,210,860 B2 | 7/2012 | Fukuda | |
| 8,465,304 B2 | 6/2013 | Yen | |
| 8,465,332 B2 | 6/2013 | McAlonis | |
| 8,540,525 B2 | 9/2013 | Regnier et al. | |
| 8,556,640 B2 | 10/2013 | Mashiyama et al. | |
| 8,651,881 B2 | 2/2014 | Regnier et al. | |
| 8,827,724 B2 | 9/2014 | Takeuchi et al. | |
| 8,840,436 B2 | 9/2014 | Glick | |
| 8,876,562 B2 | 11/2014 | Glick | |
| 8,882,518 B2 | 11/2014 | Li | |
| 8,992,237 B2 | 3/2015 | Regnier et al. | |
| 9,017,089 B2 | 4/2015 | Plested | |
| 9,325,095 B2 | 4/2016 | Sadras | |
| 9,356,377 B2 | 5/2016 | Sadras | |
| 9,368,930 B2 | 6/2016 | Smith et al. | |
| 9,450,322 B2 | 9/2016 | Ljubijankic | |
| 9,728,882 B1 | 8/2017 | Nakazawa | |
| 9,806,449 B2 | 10/2017 | Hachadorian | |
| 9,837,750 B2 | 12/2017 | Wu et al. | |
| 9,899,750 B1 | 2/2018 | Doiron | |
| 9,917,390 B1 | 3/2018 | Bianca | |
| 9,954,292 B2 | 4/2018 | Matsui | |
| 9,966,686 B2 | 5/2018 | Huang | |
| 9,979,111 B2 | 5/2018 | Yoshioka | |
| 9,999,127 B2 | 6/2018 | Back et al. | |
| 10,128,624 B2 | 11/2018 | Tyler et al. | |
| 10,177,481 B1 | 1/2019 | Hung | |
| 10,243,296 B2 | 3/2019 | Cheng | |
| 10,276,966 B1 | 4/2019 | Hitchcock et al. | |
| 10,305,213 B1 | 5/2019 | Hirakawa | |
| 10,326,236 B1 | 6/2019 | Harmelink et al. | |
| 10,374,347 B2 | 8/2019 | Bianca | |
| 10,411,381 B2 | 9/2019 | Plested | |
| 10,431,920 B1 | 10/2019 | Tate | |
| 10,615,541 B2 | 4/2020 | Morrison | |
| 10,622,742 B2 | 4/2020 | Chen | |
| 10,651,587 B2 | 5/2020 | Wu et al. | |
| 11,069,997 B1 | 7/2021 | Taylor | |
| 11,196,208 B2 | 12/2021 | Cho et al. | |
| 2001/0027037 A1 | 10/2001 | Kuo | |
| 2001/0049206 A1 | 12/2001 | Johnescu | |
| 2004/0127091 A1 | 7/2004 | Naito et al. | |
| 2009/0124136 A1 | 5/2009 | Pepe et al. | |
| 2009/0305530 A1 | 12/2009 | Ito et al. | |
| 2010/0093225 A1 | 4/2010 | Wu | |
| 2010/0184330 A1 | 7/2010 | Wu | |
| 2014/0308840 A1 | 10/2014 | Kuo | |
| 2015/0118868 A1 | 4/2015 | Choi et al. | |
| 2015/0217654 A1 | 8/2015 | Woo et al. | |
| 2015/0311612 A1 | 10/2015 | Qiao et al. | |
| 2018/0076583 A1 | 3/2018 | Yi | |
| 2019/0067853 A1 | 2/2019 | Ehrensvärd | |
| 2019/0267764 A1 | 8/2019 | Wu et al. | |
| 2020/0028295 A1 | 1/2020 | Soubh | |
| 2021/0119364 A1 | 4/2021 | Hoffman | |
| 2021/0143579 A1 | 5/2021 | Moreau | |
| 2021/0194165 A1 | 6/2021 | Haehadoriau | |
| 2021/0328378 A1 | 10/2021 | Yu et al. | |
| 2021/0376517 A1 | 12/2021 | Bobelis et al. | |
| 2021/0399456 A1 | 12/2021 | Brand | |
| 2022/0247130 A1 * | 8/2022 | Kim | H01R 13/516 |

FOREIGN PATENT DOCUMENTS

| | | | |
|---|---|---|---|
| DE | 102005003581 A1 | 7/2006 |
| EP | 1137110 A2 | 9/2001 |
| EP | 3945641 A1 | 2/2022 |
| EP | 3945642 A1 | 2/2022 |
| GB | 2485897 B | 6/2015 |
| WO | 2017005953 A2 | 1/2017 |
| WO | 19077076 A1 | 10/2018 |

* cited by examiner

CARTRIDGE STYLE MATING AND MOUNTING HARDWARE

CROSS-REFERENCE TO RELATED APPLICATIONS

This application for patent claims the benefit of priority to and incorporates herein by reference U.S. Provisional Application No. 63/333,062, entitled "Improved Connectors for Electrical Cables," filed Apr. 20, 2022.

TECHNICAL FIELD

Embodiments of the present disclosure relate to improvements in the performance, reliability, and ease-of-use of connectors for electrical cables of the type used to transmit electromagnetic energy in the radio frequency range, including twin-axial or "twinax" cable connectors, such as those used in various radio, cellular, and satellite communication systems, as well as various computers and electronic devices.

BACKGROUND

Electrical cable connectors are indispensable components in a variety of applications ranging from military, to industrial, to consumer electronics. As such, it is imperative that connectors be able to meet their designed performance and reliability specifications. This is especially true in military and aerospace applications where connectors are frequently exposed to harsh environmental and operating conditions involving mechanical vibrations and other physical stresses.

In addition, to be successful in the marketplace, manufacturers of electrical cable connectors have long had to take into consideration certain additional market factors called SWaP factors (size, weight, and power) when designing a connector. More recently, cost was added to the list of factors due to its overarching importance in any connector design, extending the original acronym to SWAP-C. It is thus understood that connectors, in order to be successful in the marketplace, must be designed to have features that not only provide performance and reliability, but also satisfy the SWaP-C factors, particularly cost.

Therefore, while a number of advances have been made in the electrical cable contractor art over the years, improvements are continually needed.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

Embodiments of the present disclosure provide an improved connector for an electrical cable and method therefor. In some embodiments, the connectors herein use a cartridge style mating and mounting hardware for mating the connectors to one another and for mounting the connectors to a printed circuit board (PCB). In some embodiments, the mating and mounting hardware includes connector shells and mating and mounting assemblies that are fully interchangeable and replaceable. In some embodiments, the mating and mounting assemblies have tapered seating faces that facilitate positioning and aligning the assemblies to the connector shells. The availability of interchangeable mating and mounting hardware means fewer types of components are required to be stocked and tracked in inventory, thereby reducing inventory maintenance costs. In addition, the use of interchangeable mating and mounting hardware greatly simplifies manufacturing and assembly, thereby further reducing costs.

In general, in one aspect, embodiments of the present disclosure relate to mating and mounting hardware for an electrical cable connector. The mating and mounting hardware comprises, among other things, a first mating and mounting assembly having a first mating portion and a first mounting portion extending from the first mating portion. The mating and mounting hardware further comprises a second mating and mounting assembly having a second mating portion and a second mounting portion extending from the second mating portion, the second mounting portion being different from the first mounting portion. The first mating portion and the second mating portion have the same cross-sectional outline at a given length.

In general, in another aspect, embodiments of the present disclosure relate to a connector for an electrical cable. The connector shell comprises, among other things, a connector shell having a generally rectangular base, a generally rectangular hood extending from the base, and a shaped mating and mounting through-hole on each side of the base. The connector further comprises mating and mounting assembly installed on the connector shell, the mating and mounting assembly comprising a first mating and mounting assembly having a first mating portion and a first mounting portion extending from the first mating portion, or a second mating and mounting assembly having a second mating portion and a second mounting portion extending from the second mating portion, the second mounting portion being different from the first mounting portion. The first mating portion and the second mating portion have the same cross-sectional outline at a given length.

In general, in yet another aspect, embodiments of the present disclosure relate to a method of assembling a connector for an electrical cable. The method comprises, among other things, providing a connector shell having a generally rectangular base, a generally rectangular hood extending from the base, and a shaped mating and mounting through-hole on each side of the base. The method further comprises installing a mating and mounting assembly on the connector shell. Installing the mating and mounting assembly comprises providing a first mating and mounting assembly in the connector shell, the first mating and mounting having a first mating portion and a first mounting portion extending from the first mating portion, or providing a second mating and mounting assembly in the connector shell, the second mating and mounting assembly having a second mating portion and a second mounting portion extending from the second mating portion, the second mounting portion being different from the first mounting portion. The first mating portion and the second mating portion have the same cross-sectional outline at a given length.

DETAILED DESCRIPTION

Figure 1A:
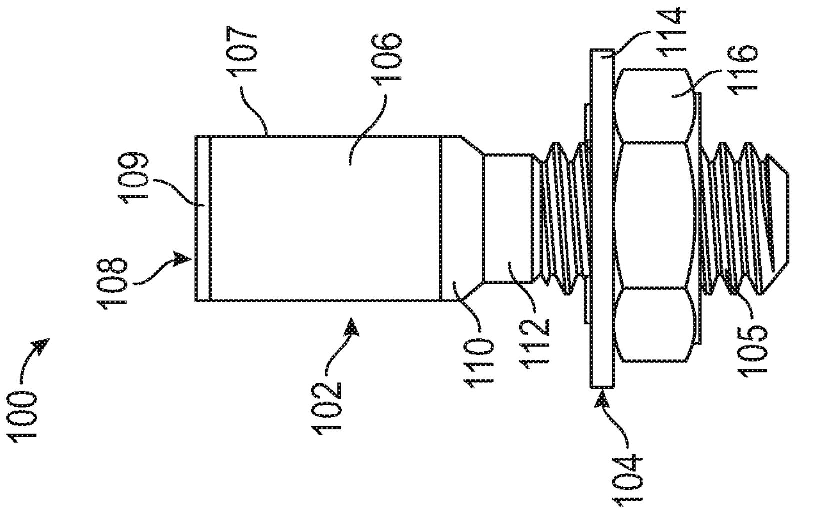
FIGS. 1A, 1B, and 1C are front, side, and perspective views showing an exemplary female mating and mounting assembly for an electrical cable connector according to embodiments of the present disclosure.

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As alluded to above, embodiments of the present disclosure relate to improved connectors for cables that are used to transmit electrical signals, particularly in the radio frequency and other high frequency ranges. Examples of such electrical cables include discrete cables, twinax cables, RF cables and other types of cables often found in radio, cellular, and satellite communication systems, computers and electronic devices, and similar applications. The connectors disclosed herein feature cartridge style interchangeable mating and mounting hardware with tapered seating faces that ensure proper positioning and alignment and increase ease of assembly. In addition, due to their interchangeability, fewer types of components are required to be stocked and tracked in inventory compared to conventional components, thereby reducing overhead expenses. The improvements in the mating and mounting hardware herein greatly reduce time and cost in manufacturing and assembly of connectors.

In some embodiments, the mating and mounting hardware in accordance with the present disclosure includes connector shells, each shell having a generally rectangular base and a generally rectangular hood extending from the base. The mating and mounting hardware herein further includes a first type of mating and mounting assembly, which may be a female mating and mounting assembly, and a second type of mating and mounting assembly, which may be a male mating and mounting assembly. The mating and mounting assemblies are interchangeable in that either type of mating and mounting assembly can be used for mating and mounting either type of connector (or shell therefor) to another connector and to a PCB. Thus, the female mating and mounting assembly can be used with a shell configured for use as a female connector, and the male mating and mounting assembly can be used with a shell configured for use as a male connector. Alternatively, the female mating and mounting assembly can be used with a shell configured for use as a male connector, while the male mating and mounting assembly can be used with a shell configured use as a female connector.

Figure 1B:
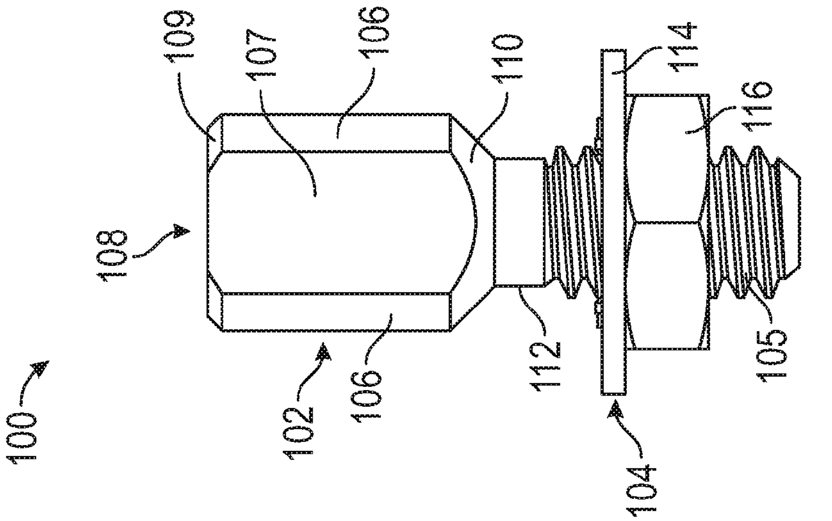
Figure 1C:
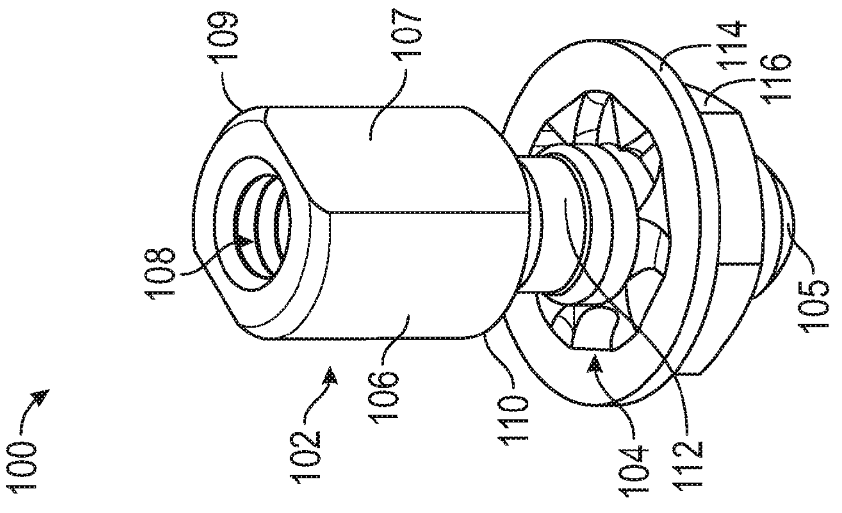

Referring now to FIGS. 1A, 1B, and 1C, front, side, and perspective views are shown for a female mating and mounting assembly 100 according to embodiments of the present disclosure. The female mating and mounting assembly 100 has a mating portion 102 and a mounting portion 104. The mating portion 102 is used to mate one connector to another connector, and the mounting portion 104 is used to mount the connector to a PCB, when the mating and mounting assembly 100 is installed in the connector.

The mating portion 102 in this example occupies approximately half of the length of the female mating and mounting assembly 100, although a longer or shorter mating portion 102 may be used. The mating portion 102 also has a specific shape, size, and/or outer surface contour that forces the mating portion 102 to be aligned or to self-align in a particular way in order to fit within the connector shell. In the embodiment shown, the mating portion 102 generally resembles an oblong barrel or cylinder having alternating curved surfaces 106 and flat surfaces 107. In other embodiments, the mating portion 102 may have a single flat surface 107 instead, similar to a cylinder truncated along its length, or more than two flat surfaces 107 (with or without curved surfaces 106).

In some embodiments, the top of the mating portion 102 has a beveled edge 109, while the bottom of the mating portion 102 tapers or angles radially inward by a predetermined angle to form a tapered curved seating face 110. The interior of the mating portion 102 is a generally cylindrical threaded bore 108. A generally cylindrical transition 112 having a predetermined diameter and length extends coaxially from the tapered seating face 110 and transitions into the mounting portion 104. The mounting portion 104, in some embodiments, may be threaded pin 105. In the embodiment shown, a washer 114 and nut 116 are provided on the threaded pin 105 for securing the connector shell to a PCB in a known manner. In some embodiments, the washer 114 may be a self-locking retaining washer.

Figure 2C:
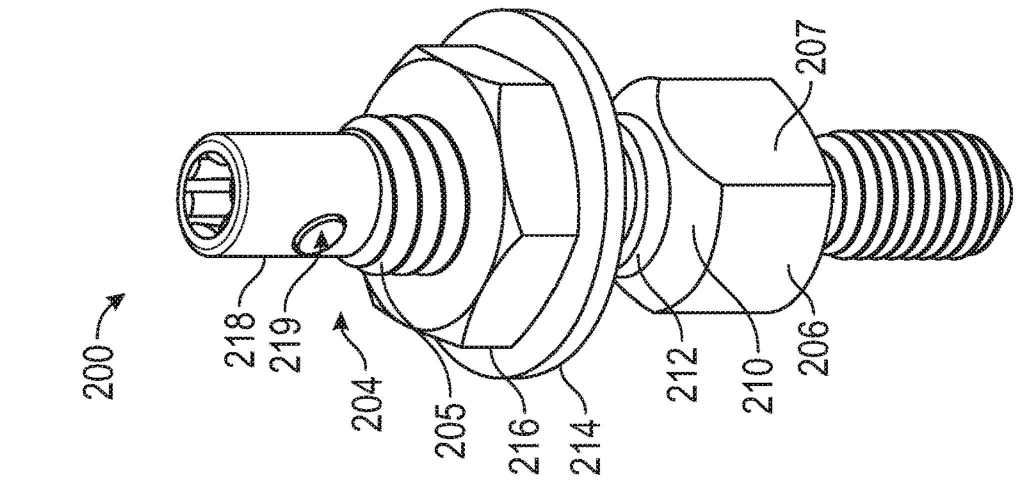
FIGS. 2A, 2B, and 2C are front, side, and perspective views showing an exemplary male mating and mounting assembly for an electrical cable connector according to embodiments of the present disclosure.
Figure 2B:
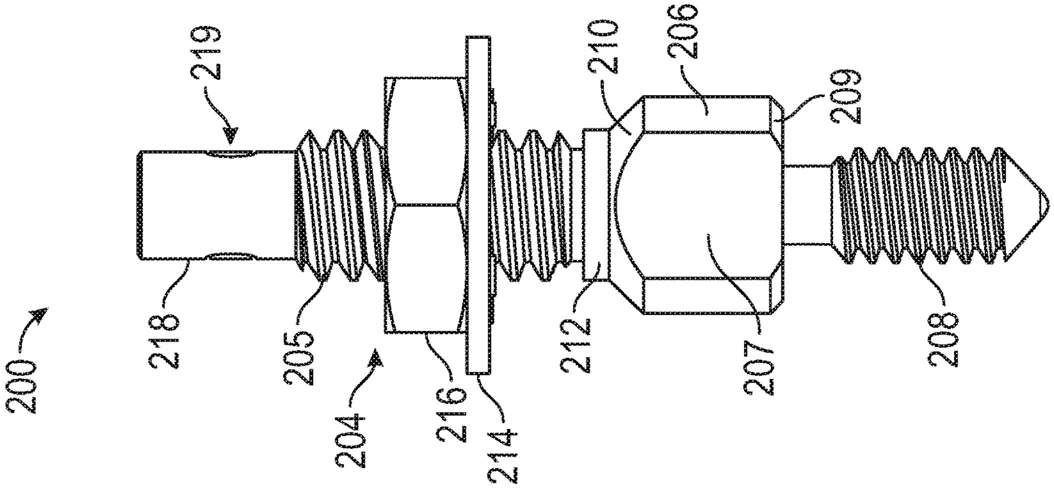
Figure 2A:
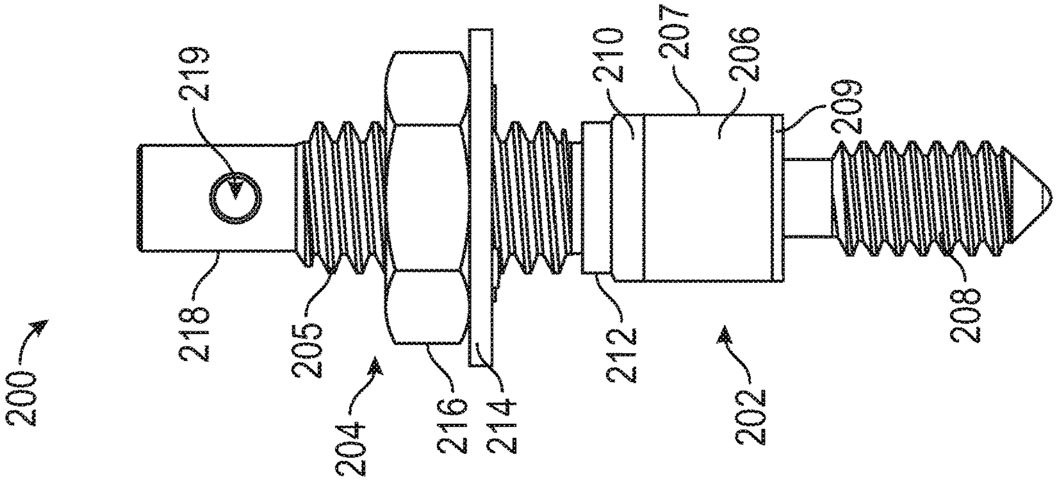

Referring next to FIGS. 2A, 2B, and 2C, front, side, and perspective views are shown for a male mating and mounting assembly 200 according to embodiments of the present disclosure. The male mating and mounting assembly 200, like its female counterpart, has a mating portion 202 and a mounting portion 204. As before, the mating portion 202 is used to mate one connector to another connector, while the mounting portion 204 is used to mount the connector to a PCB, when the mating and mounting assembly 200 is installed in the connector.

The mating portion 202 depicted here again occupies approximately half of the length of the male mating and mounting assembly 200, although a longer or shorter mating portion 202 may be used. The mating portion 202 also has a particular shape, size, and/or outer surface contour that forces the mating portion 202 to be aligned or to self-align in a particular manner in order to fit within the connector shell. In the embodiment shown, the mating portion 202 includes an oblong barrel or cylinder having alternating curved surfaces 206 and flat surfaces 207. A threaded pin 208 having threads along its lower portion extends coaxially through the mating portion 202 (oblong barrel or cylinder) and also the mounting portion 204. As with its counterpart described above, the mating portion 202 may have a single flat surface 207 instead in some embodiments, or more than two flat surfaces 207 (with or without curved surfaces 206) in some embodiments.

In some embodiments, the bottom of the mating portion 202 has a beveled edge 209, while the top of the mating portion 202 tapers or angles radially inward by a predetermined angle to form a tapered curved seating face 210. A generally cylindrical transition 212 having a predetermined diameter and length extends coaxially from the tapered seating face 210 and transitions into the mounting portion 204. The mounting portion 204, in some embodiments, may include a threaded shaft 205. In the embodiment shown, a washer 214 and nut 216 are provided on the threaded shaft 205 for securing the connector shell to a PCB. In some embodiments, the washer 214, like its counterpart above, may be a self-locking retaining washer.

In some embodiments, a generally tubular head 218 is attached to the top of the threaded pin 208 (which extends coaxially through the threaded shaft 205). When thus attached, the threaded pin 208 and the head 218 act as one piece, such that turning the head 218 turns the threaded pin 208. The head 218 may be secured to the threaded pin 208, for example, by a grooved pin (not expressly shown) inserted through sides holes 219 in the head 218 (and also in the threaded pin 208). The head 218 may be sized and shaped to receive a tool, such as a hexagonal wrench or similar tool, for turning the threaded pin 208. It will be appreciated that other types of heads 218 may be used with the threaded pin 208 to accommodate other types of tools, including various types of screw heads.

In some embodiments, the threaded shaft 205, the cylindrical transition 212, and the oblong barrel or cylinder are one piece, sometimes referred to as a bushing or cartridge. To assemble the male mating and mounting assembly 200, the threaded pin 208 slides is slid into the bushing/cartridge from the end having the beveled edge 209, then through the threaded shaft 205, and thereafter secured to the head 218. When thus assembled, the head 218 protrudes coaxially from the threaded shaft 205 at one end, and the threaded portion of the threaded pin 208 extends coaxially from the oblong barrel or cylinder at the other end.

Figure 3B:
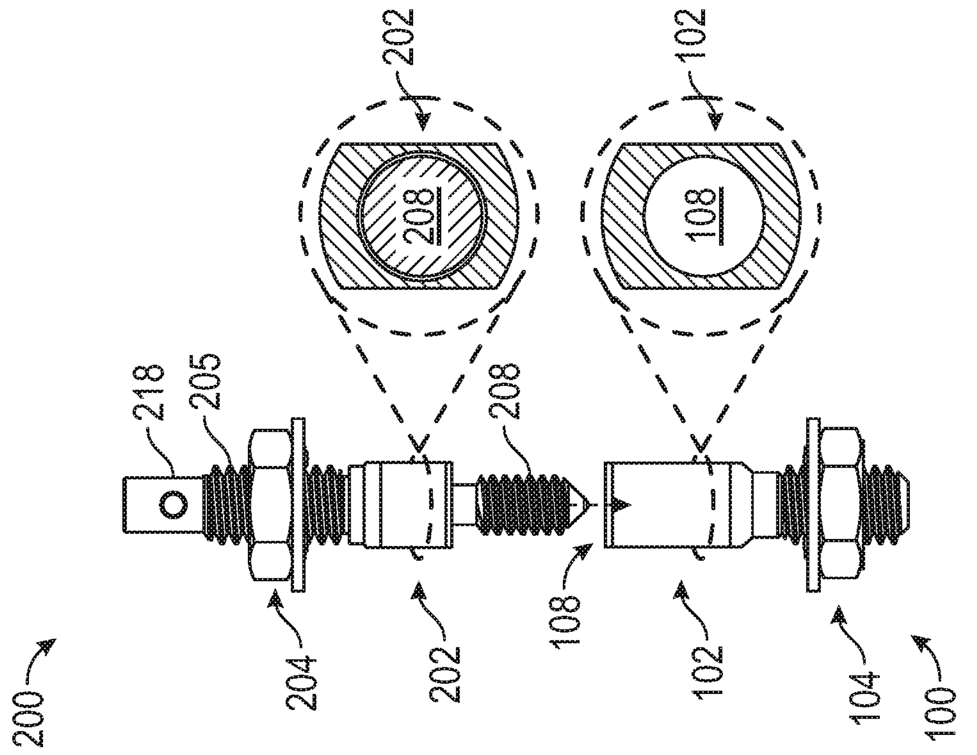
FIGS. 3A and 3B are front and side views showing the exemplary female and male mating and mounting assemblies according to embodiments of the present disclosure.
Figure 3A:
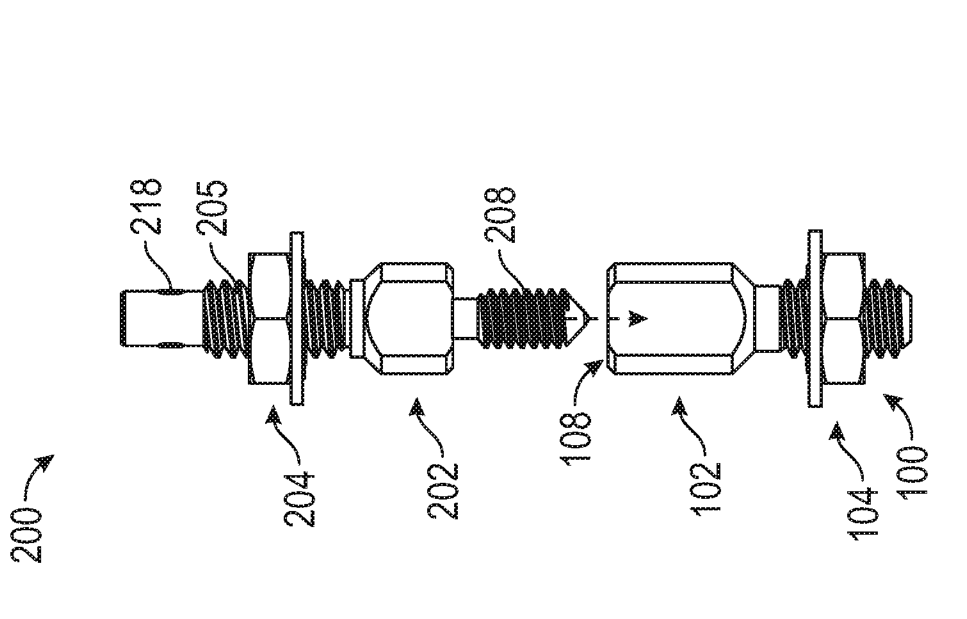

FIGS. 3A and 3B show how the female mating and mounting assembly 100 can receive the male mating and mounting assembly 200 to mate or bring together two connectors (or shells therefor). In a typical scenario, the female and male mating and mounting assemblies 100, 200 are coaxially aligned such that the threaded bore 108 of the female mating and mounting assembly 100 is directly opposite the threaded pin 208 of the male mating and mounting assembly 200. The threaded bore 108 and the threaded pin 208 are then brought together, as indicated by the arrow. An appropriate tool is used to engage the head 218 of the male mating and mounting assembly 200 to rotate the threaded pin 208 into the threaded bore 108. The threaded pin 208 should rotate freely relative to the mating portion 202 (oblong barrel or cylinder) when the mating and mounting assembly 200 is installed in the connector.

Figure 4B:
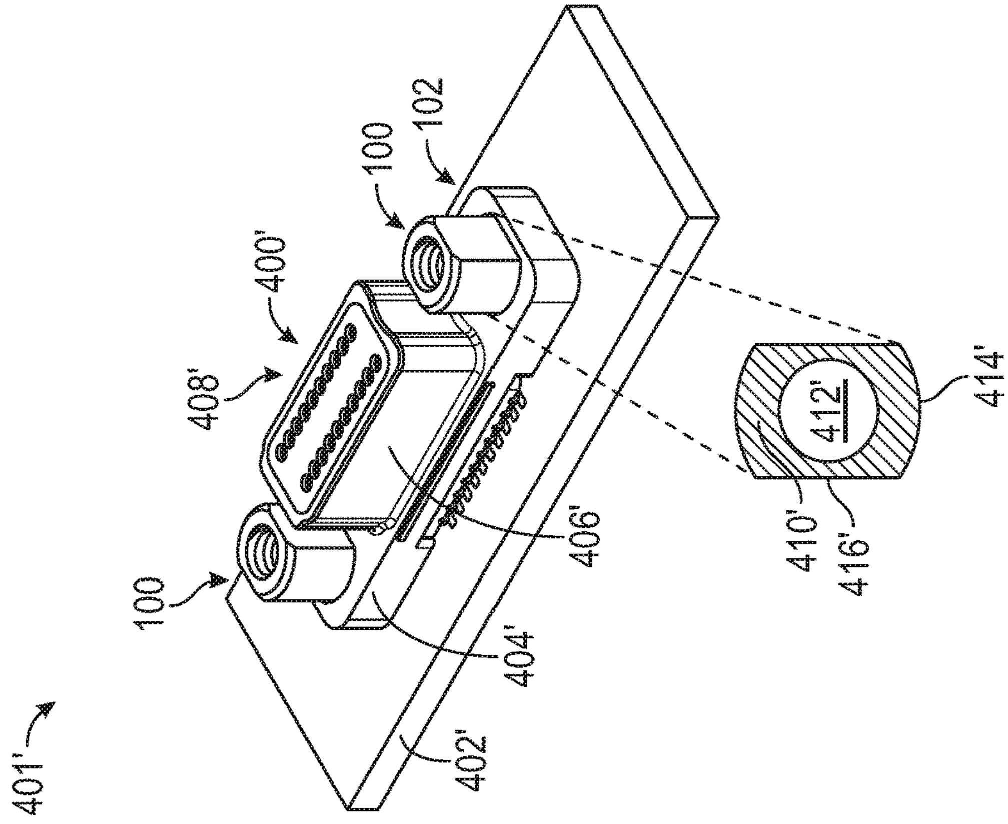
FIGS. 4A and 4B are perspective views of a shell configured for use as male and female cable connectors, respectively, according to embodiments of the present disclosure.
Figure 4A:
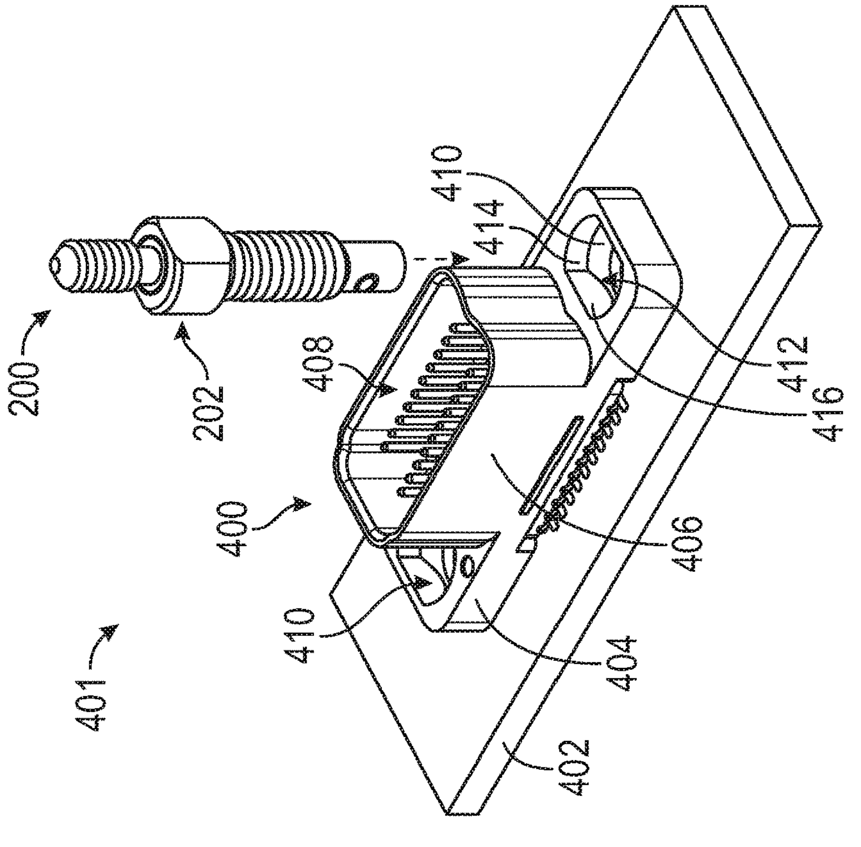

FIGS. 4A and 4B illustrates perspective views of exemplary shells on which the mating and mounting assemblies 100, 200 herein may be used. In FIG. 4A, an exemplary connector shell 400 has been made into or otherwise configured for use as a male connector 401. The connector 401 in this example is a type of connector that is typically mounted to a PCB 402. However, this board-mount connector 401 is exemplary only and many other types of connectors are contemplated for use with the mating and mounting hardware herein.

As can be seen, the connector shell 400 has a generally rectangular base 404 and a generally rectangular hood 406 extending perpendicularly from the base 404. The protective hood 406 defines a generally rectangular opening in which a plurality of connector leads 408 may be arranged to form the male connector 401. Shaped mounting and mating through-holes 412 are provided in the base 404 of the shell 400, one through-hole 412 on each side of the protective hood 406. The mounting and mating through-holes 412 each have a shape, size, and/or inner surface contour that precisely fits or corresponds to the shape, size, and/or outer surface contour of the mating portions 102, 202 of the mating and mounting assemblies 100, 200. This configuration forces the mating and mounting assemblies 100, 200 be aligned or to self-align in a particular way in order to fit into the shaped through-holes 412.

In the embodiment shown, each shaped through-hole 412 has alternating curved surfaces 414 and flat surfaces 416 and a generally oblong outline when viewed from above (i.e., plan view). The generally oblong outlines of the shaped through-holes 412 match the generally oblong outline of a cross-section of the mating portions 102, 202 of the mating and mounting assemblies 100, 200. The generally oblong cross-sectional outlines of the mating portions 102, 202 can be more clearly seen in FIG. 3B (within the dashed circles). A tapered seating face 410 is provided in each shaped through-hole 412 that tapers or angles radially inward by a predetermined angle to complement the tapered seating faces 110, 210 of the female and male mating and mounting assemblies 100, 200.

FIG. 4B shows an exemplary connector shell 400' that has been made into or otherwise configured for use as a female connector 401'. The main difference between the connector 401' here and the connector 401 from FIG. 4A is instead of connector leads 408, a female connector portion 408' (socket holder) is provided for holding a plurality of lead sockets (not visible here).

As can be seen, the shell 400' is similar to the shell 400 from FIG. 4A in this example. That is, the shell 400' has a generally rectangular base 404' and a generally rectangular hood 406' extending perpendicularly from the base. The female connector portion 408' (socket holder) mentioned above is disposed within the protective hood 406'. Shaped through-holes 412' are provided in the base 404', one shaped through-hole 412' on each side of the protective hood 406'. The shaped through-holes 412' allow the connector 401' to be mounted to a PCB 402' and are identical to their counterparts in FIG. 4A for that purpose. The shaped through-holes 412' also operate to prevent the mating portions 102, 202 from rotating relative to the shell 400' due to turning of the nuts 116, 216.

Figure 5B:
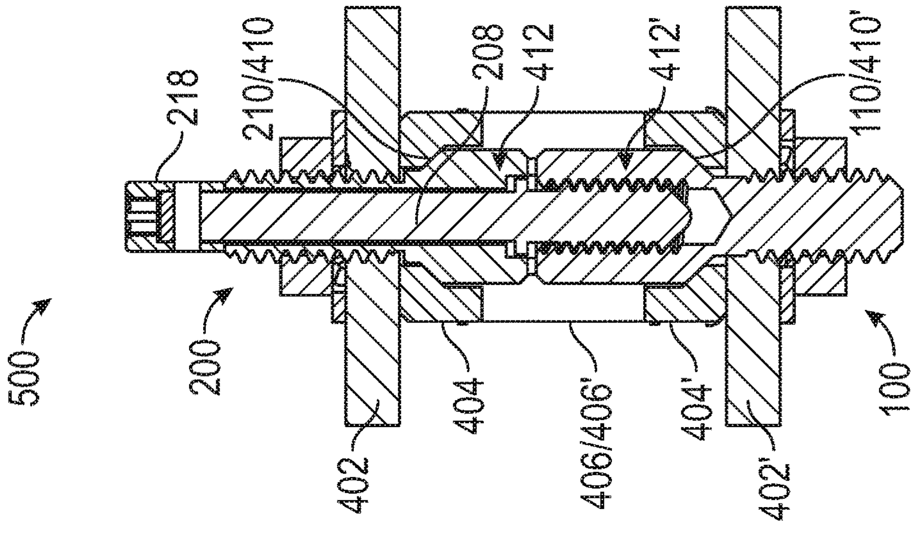
FIGS. 5A and 5B are front and cross-sectional side views showing male and female cable connectors connected together using the exemplary mating and mounting hardware herein according to embodiments of the present disclosure.
Figure 5A:
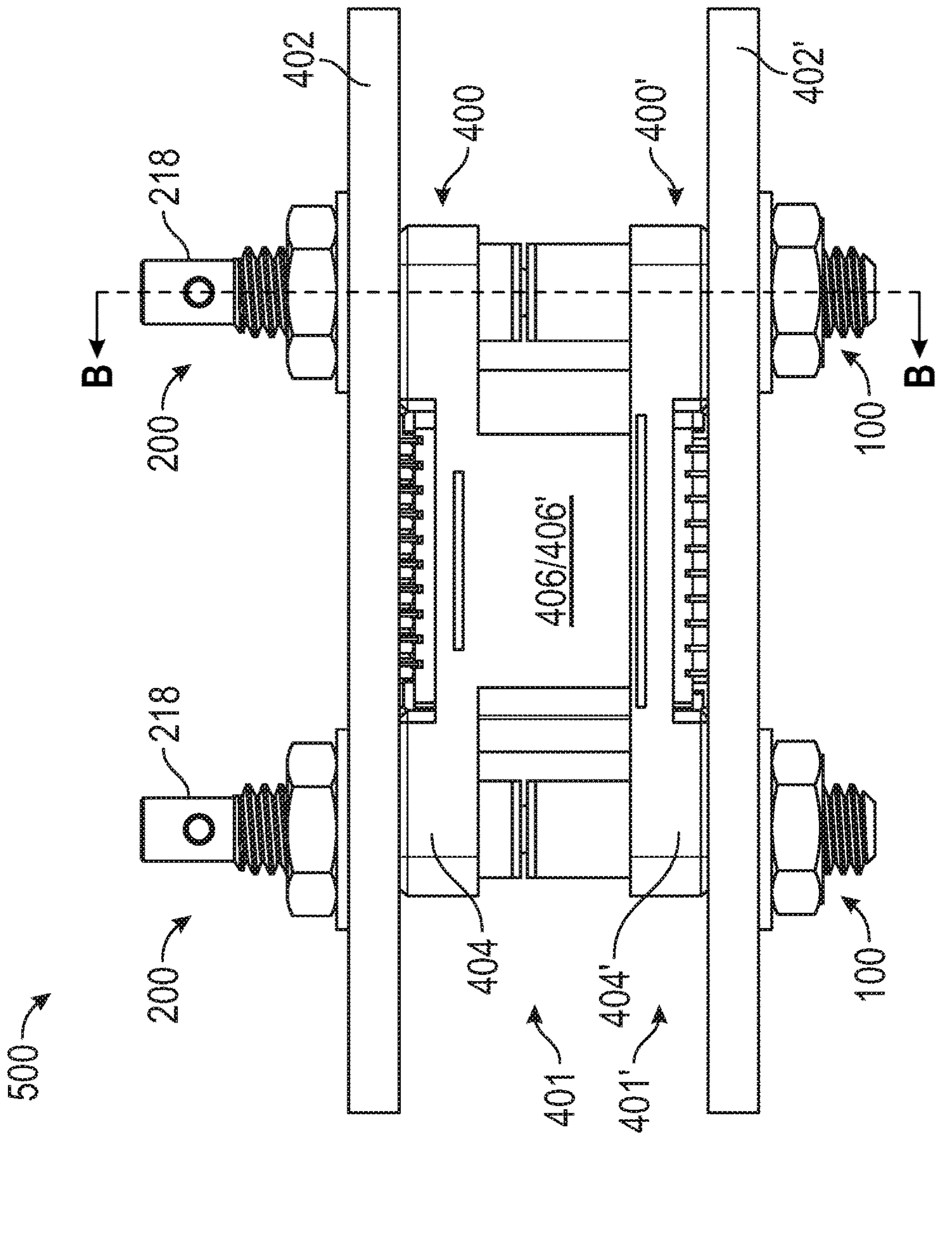

FIGS. 5A and 5B show front and cross-sectional side views of a connector assembly 500 with the male and female connectors 401, 401' from FIGS. 4A and 4B connected together using the exemplary mating and mounting assemblies 100, 200 herein according to embodiments of the present disclosure. In these views, each of the connector shells 400, 400' has been mounted to its respective PCB 402, 402' and mated to one another, with the protective hoods 406, 406' fitted together so that the connector leads 408 are inserted within the socket holder 408'. As best seen in FIG. 5B (which is a cross-sectional view of FIG. 5A along line B-B), each mating and mounting assembly 100, 200 has been inserted into a respective shaped through-hole 412, 412' such that its tapered seating faces 110, 210 sits on the tapered seating faces 410, 410' of the respective shaped through-hole 412, 412'. The threaded pin 208 of the male mating and mounting assembly 200 has been screwed (via turning of the head 218) into the oblong barrel or cylinder of the female mating assembly 100 to secure the connector shells 400, 400' to one another.

Figure 6:
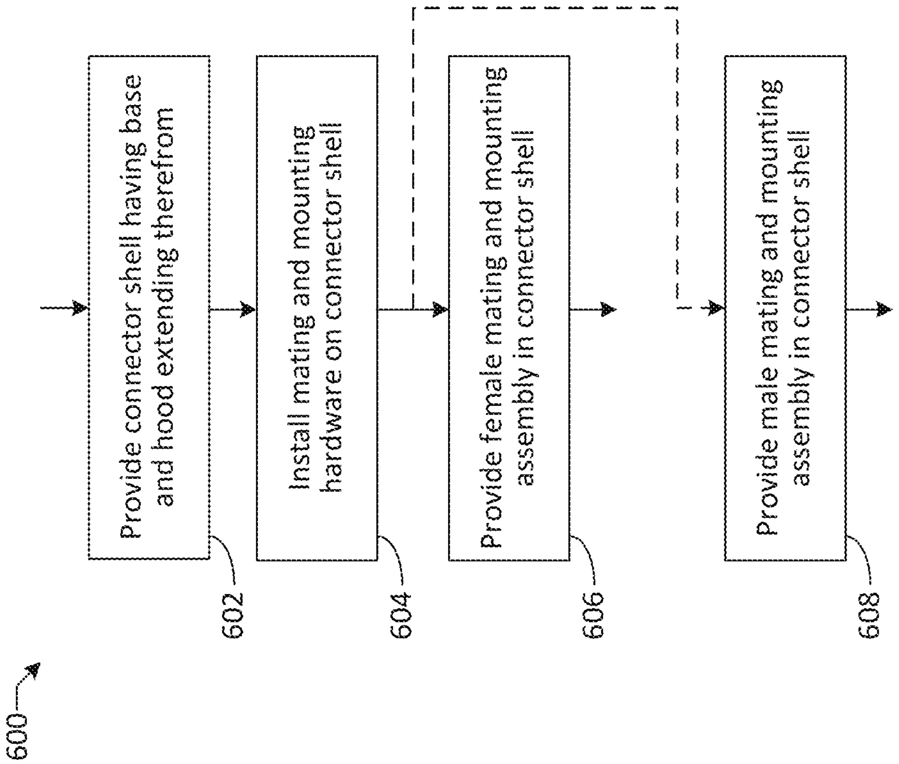
FIG. 6 is a flowchart showing an exemplary method of assembling an electrical connector having the exemplary mating and mounting hardware herein according to embodiments of the present disclosure.

Turning now to FIG. 6, a flowchart showing an exemplary method of assembling an electrical connector having the exemplary mating and mounting hardware herein according to embodiments of the present disclosure. The flowchart 600 generally begins at 602, where a connector shell is provided having a generally rectangular base, a generally rectangular hood extending perpendicularly from the base, and a shaped mating and mounting through-hole on each side of the base. At 604, a mating and mounting assembly is installed on the connector shell. In some embodiments, the installation includes providing a female mating and mounting assembly in the connector shell, indicated at 606, the female mating and mounting having a female mating portion and a female mounting portion extending from the male mating portion. In some embodiments, the installation includes providing a male mating and mounting assembly in the connector shell, indicated at 608, the male mating and mounting having a male mating portion and a male mounting portion extending from the male mating portion. In some embodiments, the female mating portion and the male mating portion have the same cross-sectional outline at a given length.

While a number of specific embodiments have been shown and described herein, it is to be understood that such embodiments are intended to be exemplary only. Many other exemplary embodiments will become apparent upon reading and understanding the present specification and drawings. Accordingly, the specification and drawings are to be regarded as illustrative and not restrictive. The scope of the present disclosure should therefore be determined with reference to the appended claims, including the full scope of equivalents to which such claims are entitled.

We claim:

1. A mating and mounting hardware for an electrical cable connector, the mating and mounting hardware comprising:

a first mating and mounting assembly having a first mating portion and a first mounting portion extending from a first end of the first mating portion; and a second mating and mounting assembly having a second mating portion and a second mounting portion extending from the second mating portion, the second mounting portion being different from the first mounting portion;

wherein the first mating portion of the first mating and mounting assembly comprises a tapered seating face at the first end.

2. The mating and mounting hardware of claim 1, wherein the second mating portion of the second mating and mounting assembly comprises a tapered seating face thereon.

3. The mating and mounting hardware of claim 2, further comprising a connector shell having shaped mating and mounting through-holes therein, each shaped mating and mounting through-hole having a tapered seating face configured to receive the first mating portion or the second mating portion.

4. The mating and mounting hardware of claim 3, wherein an outline of each shaped mating and mounting through-hole corresponds to the cross-sectional outline at a given length of the first mating portion or the second mating portion.

5. The mating and mounting hardware of claim 1, wherein the first mating portion is a female mating portion, the female mating portion comprising a generally oblong barrel and a generally cylindrical threaded bore therein.

6. The mating and mounting hardware of claim 5, wherein the second mating portion is a male mating portion comprising a generally oblong barrel and a threaded pin extending from the generally oblong barrel.

7. The mating and mounting hardware of claim 6, wherein the threaded pin of the male mating portion is configured to be screwed into the threaded bore of the female mating portion, at a second end of the first mating portion, to engage the male mating portion and the female mating portion.

8. A connector assembly for an electrical cable, the connector assembly comprising:

a connector shell having a generally rectangular base, a generally rectangular hood extending from the base, and a shaped mating and mounting through-hole on each side of the base;

a first mating and mounting assembly having a first mating portion and a first mounting portion extending from the first mating portion;

a second mating and mounting assembly having a second mating portion and a second mounting portion extending from a first end of the second mating portion, the second mounting portion being different from the first mounting portion; and a mating and mounting assembly installed on the connector shell, the mating and mounting assembly comprising the first mating and mounting assembly or the second mating and mounting assembly, wherein the second mating portion comprises a tapered seating face at the first end.

9. The connector assembly of claim 8, wherein the first mating portions of the first mating and mounting assembly comprises a tapered seating face thereon.

10. The connector assembly of claim 8, wherein each shaped mating and mounting through-hole has a tapered seating face configured to receive the first mating portion or the second mating portion.

11. The connector assembly of claim 8, wherein an outline of each shaped mating and mounting through-hole corresponds to the cross-sectional outline at a given length of the first mating portion or the second mating portion.

12. The connector assembly of claim 8, wherein the first mating portion is a female mating portion, the female mating portion comprising a generally oblong barrel and a generally cylindrical threaded bore therein.

13. The connector assembly of claim 12, wherein the second mating portion is a male mating portion comprising a generally oblong barrel and a threaded pin extending from the generally oblong barrel.

14. The connector assembly of claim 13, wherein the threaded pin of the male mating portion, at a second end of the second mating portion, is configured to be screwed into the threaded bore of the female mating portion to engage the male mating portion and the female mating portion.

15. A method of assembling a connector assembly for an electrical cable, the method comprising:

providing a connector shell having a generally rectangular base, a generally rectangular hood extending from the base, and a shaped mating and mounting through-hole on each side of the base;

providing a first mating and mounting assembly in the connector shell, the first mating and mounting assembly having a first mating portion and a first mounting portion extending from an end of the first mating portion; or providing a second mating and mounting assembly in the connector shell, the second mating and mounting assembly having a second mating portion and a second mounting portion extending from the second mating portion, the second mounting portion being different from the first mounting portion; and installing a mating and mounting assembly on the connector shell, wherein installing the mating and mounting assembly comprises installing the first mating and mounting assembly or installing the second mating and mounting assembly, wherein the first mating portion has a tapered seating face at the end from which the first mounting portion extends.

16. The method of claim 15, wherein the second mating portion has a tapered seating face thereon.

17. The method of claim 15, wherein each shaped mating and mounting through-hole has a tapered seating face configured to receive the first mating portion or the second mating portion.

18. The method of claim 15, wherein an outline of each shaped mating and mounting through-hole corresponds to a cross-sectional outline at a given length of the first mating portion or the second mating portion.

19. The method of claim 15, wherein the first mating portion is a female mating portion, the female mating portion comprising a generally oblong barrel and a generally cylindrical threaded bore therein.

20. The method of claim 19, wherein the second mating portion is a male mating portion comprising a generally oblong barrel and a threaded pin extending from the generally oblong barrel.

* * * * *